I. J. PLOUGHE.
BROODER.
APPLICATION FILED APR. 18, 1912.
1,043,139.
Patented Nov. 5, 1912.
3 SHEETS—SHEET 1.
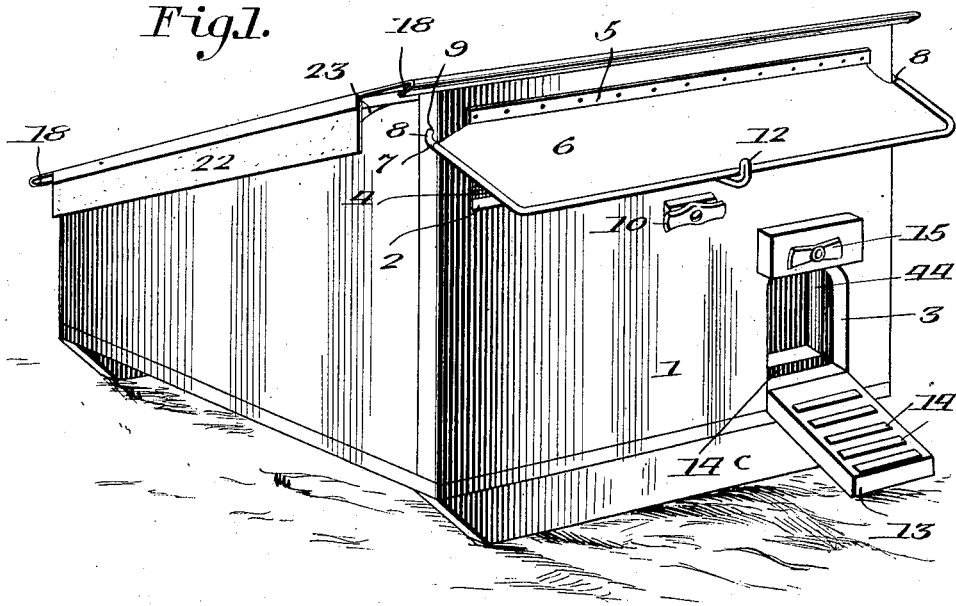
Fig. 1.
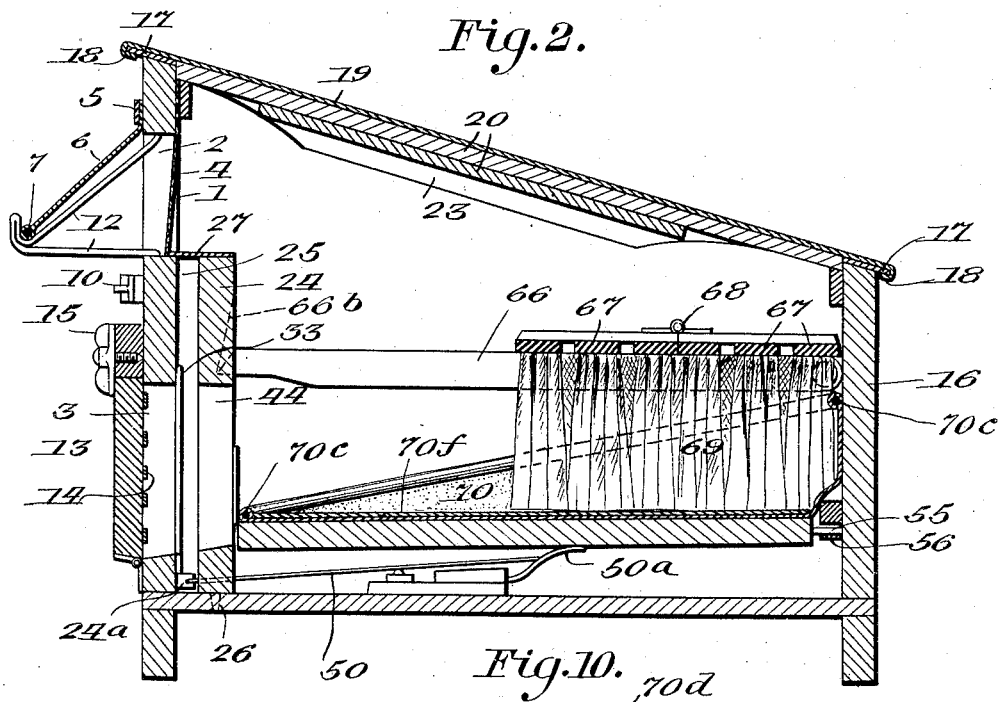
Fig. 2.
Fig. 10.
WITNESSES
Philip E. Barnes
Edna J. Sheehy
INVENTOR
Isaac J. Ploughe
By James Sheehy & Co.
Attorneys

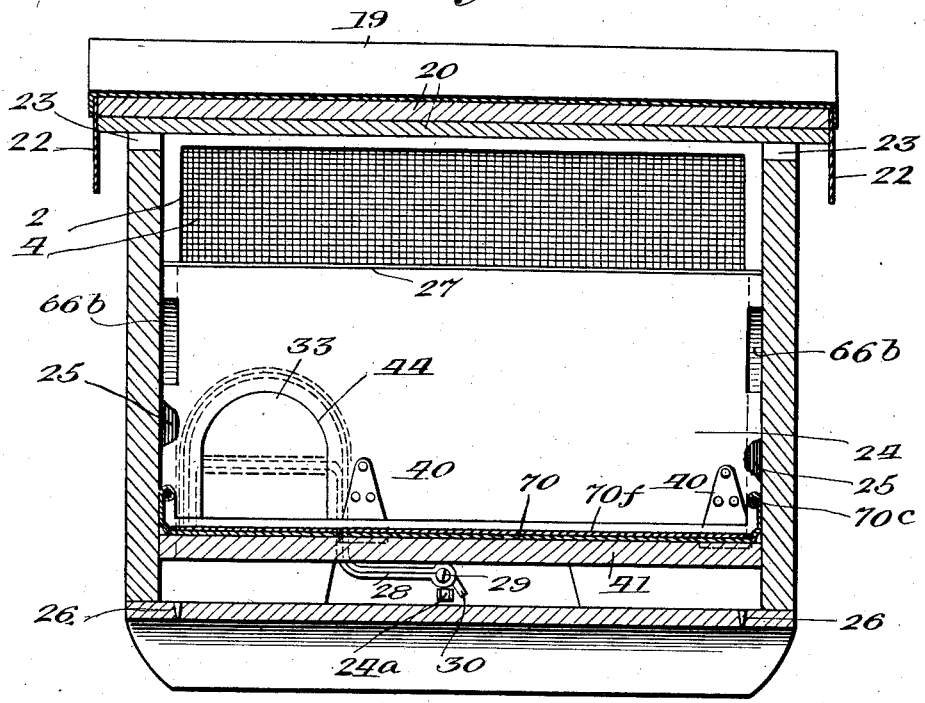
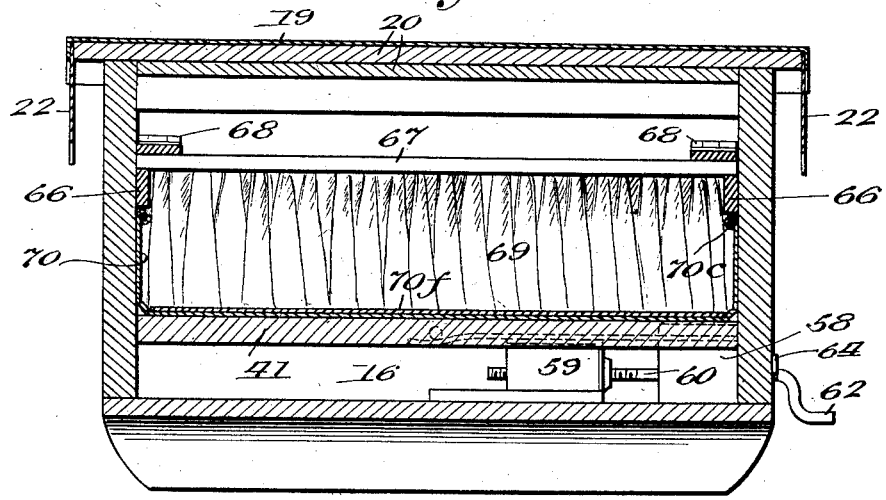

I. J. PLOUGHE.
BROODER.
APPLICATION FILED APR. 18, 1912.
1,043,139.
Patented Nov. 5, 1912.
3 SHEETS—SHEET 3.
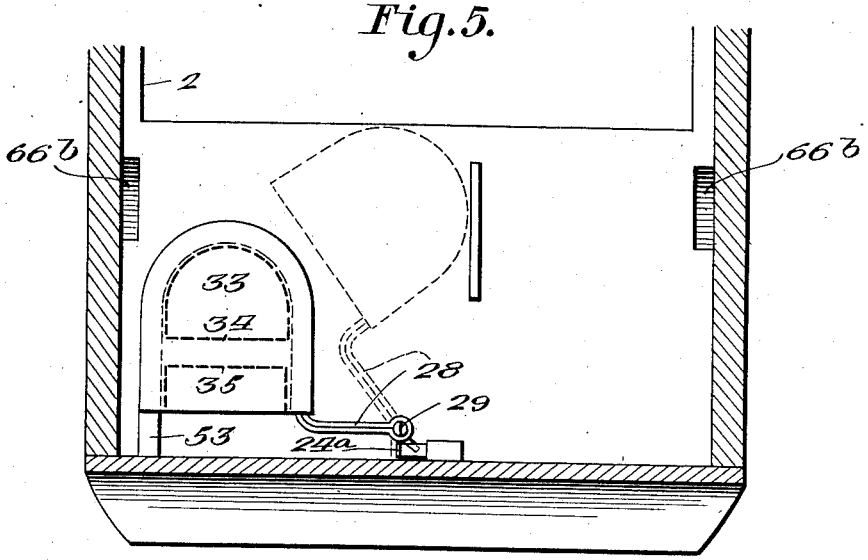
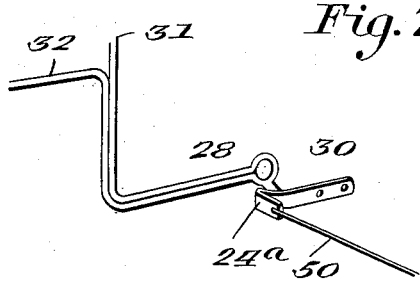
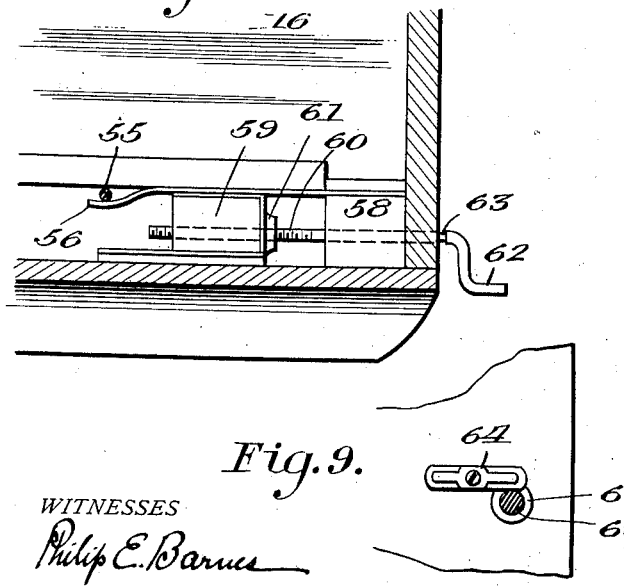
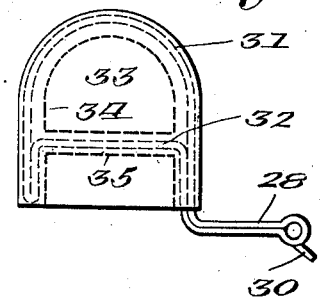
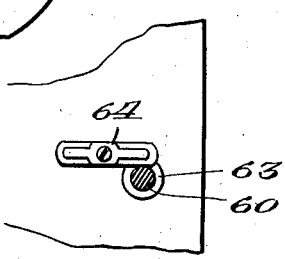
WITNESSES
INVENTOR

UNITED STATES PATENT OFFICE.

ISAAC J. PLOUGHE, OF PLAINVILLE, ILLINOIS.

BROODER.

1,043,139.  Specification of Letters Patent.  Patented Nov. 5, 1912.

Application filed April 18, 1912. Serial No. 691,594.

*To all whom it may concern:*

Be it known that I, ISAAC J. PLOUGHE, citizen of the United States, residing at Plainville, in the county of Adams and State of Illinois, have invented new and useful Improvements in Brooders, of which the following is a specification.

My present invention pertains to combined coops and brooders for young chickens, and is designed more particularly as an improvement upon the coop and brooder constituting the subject matter of my Letters-Patent No. 1,009,567 of Nov. 21, 1911. The said patented coop and brooder is calculated to exclude more than a predetermined number of young chickens with the possible view of increasing the present great poultry raising industry to twenty or more times its present magnitude, and at no additional increase in labor; also, to give the chickens wider range, and to prevent the great annual loss due to crowding and suffocation of the chickens in the device when they return to the same from the range; and the object of my present invention is to provide a combined coop and brooder that is in several practical respects a material improvement upon my said patented coop and brooder.

The present invention in all of its details will be fully understood from the following description and claims when the same are read in connection with the accompanying drawings, constituting part hereof, in which:

Figure 1 is a perspective of my novel device. Fig. 2 a vertical section extending from front to rear thereof. Fig. 3 is a transverse vertical section of the device, looking forward. Fig. 4 is a transverse vertical section, looking rearward and illustrating the capacity-regulating means. Fig. 5 is a detail transverse section with parts in elevation, and showing the manner of mounting the gravitating door. Fig. 6 is an enlarged detail section illustrative of the capacity-regulating means with the turn-button omitted to illustrate the circumferential groove in the shaft. Fig. 7 is a detail perspective showing the relative arrangement of the frame of the gravitating door and the spring trigger. Fig. 8 is a detail elevation of the gravitating door *per se*. Fig. 9 is a detail view showing the relative arrangement of the grooved shaft and the turn-button. Fig. 10 is a detail view showing one way of attaching the litter sack and its frame to the back wall of the body.

Similar numerals of reference designate corresponding parts in all of the views of the drawings.

The body of my novel casing is provided with a comparatively high front wall 1 designed to be arranged toward the south, and in said front wall is formed a large ventilation opening 2 and an entrance opening 3. The ventilation opening is barred by a wire screen 4 connected to the wall 1, and attached at 5 to the outer side of the wall 1 at a point above opening 2 is a combined awning and closure device 6 of textile material. This awning and closure device is connected to a wire frame 7 having trunnions 8 at its ends, journaled in sockets 9 in the ends of the wall 1, and hence it will be manifest that the awning may be arranged in pendent position close against the wall 1, in which position it may be secured by a turn-button 10. It will also be manifest that the awning can be positioned at an angle to the wall 1 so as to shade the opening 2, and can be supported in the latter position by a bracket 12. This bracket 12 is pivoted in the upper and lower walls of the opening 2 and can therefore be swung into the opening so as to be out of the way when it is desired to close the awning. The textile of which the awning is composed is preferably of such character that when the awning is closed pure atmospheric air can pass therethrough and into the body.

The opening 3 can be closed when desired by a door 13 which protects the cloth door from rats, etc. This door 13 is hinged immediately below the opening 3 and is provided on its upper and inner side with footholds 14 so as to enable the chicks to readily climb to the opening 3 when the door is let down. When the door is closed it is preferably secured in such position by a turn-button 15.

The front wall 1 and the back wall 16 of the body are provided with flanges 17, preferably of metal, and slidably engaged with the said flanges are complementary flanges 18 on the top 19 which is preferably of sheet-metal, and is stiffened by portions 20 of wood at its underside, this for strength and warmth. By virtue of said construction the top 19 can be slid entirely off the body, and can be as readily replaced thereon, and when replaced is not liable to be casually displaced by wind or otherwise. Also the top can be slid open to a greater or less extent so as to cover a portion of the interior of the body and leave the remainder of said interior uncovered to admit air and sunshine. At its ends the top 19 is provided with curtain guards 22, of oilcloth or other appropriate material designed when the top is closed to overhang the side ventilators of the body and exclude the drafts and weather from the interior and permit pure air to enter and foul air to escape. In this connection it will be noticed that the upper edges of the side walls of the body are disposed below the upper edges of the front and back walls and are recessed, as indicated by 23, so as to afford clearance for the wood portions at the underside of the top 19, incidental to moving the top on and off the body.

24 is a front wall arranged in the body and spaced by cleats 25 or other suitable means, from the inner side of the front wall 1. On its lower edge said wall 24 is provided with dowel pins 26 which rest in sockets in the bottom of the body so as to maintain the wall 24 in proper position in the body, and yet permit of said wall being readily removed when necessary. At its upper edge the wall 24 is provided with a flange 27, preferably of sheet-metal, which extends to and rests above the lower wall of the opening 2 in the front wall 1, this with a view to preventing debris dropping into the space between the walls 1 and 24 and interfering with the operation of the gravitating door, presently described. The said gravitating door is arranged to swing vertically and parallel to the walls 1 and 24, and comprises a frame, preferably of metal, and a covering preferably of textile material. The frame comprises an arm 28 pivoted at 29 to the inner side of the front wall 1, and having a depending finger 30, a U-shaped portion 31 suitably fixed to or formed integral with the arm 28 at the end thereof remote from the finger 30, and a bail-shaped portion 32 having its arms soldered or otherwise fixed within and to the lower portions of the arms of the U-shaped member 31. The U-shaped member 31 is preferably of wire, as is also the bail-shaped member 32, and the function of the latter is to lend the necessary rigidity and strength to the U-shaped portion 31 of the frame, and this without interfering with a quality possessed by the textile material as hereinafter described. The textile material is numbered 33, and is in two thicknesses, or in other words is fitted over the U-shaped portion of the frame, and its thicknesses are stitched together on a sewing machine or otherwise by a line of stitches 34 arranged within the U-shaped member of the frame and above the bail-shaped member, and also by a line of stitches 35 arranged below the cross-bar of the bail-shaped member of the frame. By virtue of this, the textile material is cheaply and strongly secured on the frame, and it will be noticed in this connection that at the lower edge of the door and between the ends of the bail-shaped frame member there is nothing but textile material. Consequently if a chick be caught under the closing door, the chick will not be hurt in the least or injured in any way, but on the other hand will be free to move from under the door and into the interior of the body.

Hinged at 40 to the wall 24 is the false bottom 41 of the device, and arranged under the said false bottom and suitably supported is the spring trigger $24^a$ through the medium of which the gravitating door is maintained in a raised position so as to permit chicks to pass through the opening 3 in wall 1, and the coincident opening 44 in the wall 24, until a predetermined number of chicks are gathered in the device and on the false bottom, and is then released automatically and permitted to gravitate to a closed position so as to prevent the escape of chicks through the said openings, and also prevent any more chicks entering the device. The said spring trigger comprises a portion fixed at one end and extending from the point of fixture and at an acute angle toward the inner side of the wall 1, and a portion extending rearward from the forward end of the first-named portion and at a right angle to the inner side of the wall 1. To the rear end of the second named portion of the spring trigger is connected a cable 50 which extends rearwardly through suitable guide means, and is connected at its rear end to the rear and upper end of a curvilinear spring plate $50^a$, the forward portion of which is suitably fixed on the bottom of the body by means of a screw through a slot in spring plate $50^a$. By virtue of this, it will be seen that when the door is open, the finger 30 of its frame will rest against the rearwardly directed portion of the spring trigger, and hence the door will be maintained in a raised position so as to leave the entrance openings in the walls 1 and 24 entirely unobstructed. It will also be understood that when the spring trigger is pulled through the medium of the cable rearwardly and out of the path of the said finger 30, the gravitating door will drop to its closed position and the end of the door frame will bring up against a block 53 on the bottom of the body. The false bottom 41 is disposed above the free end of the curvilinear spring plate $50^a$, but in light contact with it and hence it will be manifest that depression of the false bottom will be attended by downward and rearward movement of the upper and rear end of the spring plate $50^a$, whereupon the spring plate will, through the medium of the cable, pull the spring trigger rearward and release the gravitating door. In this connection it will be noticed that when it is desired to set the gravitating door for the entrance of chicks it is simply necessary for the attendant to press upward on the lower edge of the textile material of the door, and thereby move the door upward sufficiently to enable the finger 30 of the door frame to press the spring trigger rearward and out of its way and assume a position between the spring trigger and the door, when the spring trigger will resume its normal position and hence will maintain the gravitating door in its raised position. At its rear end the false bottom is provided with a rearwardly extending pin 55. This latter rests on a spring plate 56, and by regulating the tension of the said spring plate 56 the weight under which the false bottom will be moved downward can be predetermined and fixed. The spring plate 56 extends transversely of the body at a point adjacent the back wall thereof, and one end portion of the said spring plate is fixed to and supported by a fixed block 58. At an intermediate point of its length the spring plate 56 is supported by a suitably guided block 59 which is adjustable in the direction of the length of the spring plate 56, and consequently in the direction of the width of the brooder. The block 59 is adjusted and adjustably fixed through the medium of a transversely disposed screw 60 which bears in and engages a nut 61 that is fixed to the block 59 and extends through one of the side walls of the body, preferably the left-hand side wall looking forward from a view point at the rear of the brooder. At or adjacent the outer side of the mentioned side wall of the body, the screw terminates in a crank 62. It will also be observed by reference to Fig. 4 that the portion of the screw shaft outside the body is provided with a circumferential groove 63, and that a turn-button 64 is pivoted on the mentioned side wall of the body and in such a position that one of its arms is movable into and out of the said circumferential groove. This provision is advantageous because when the turn-button is disposed in the circumferential groove of the screw shaft, the shaft will be held against endwise movement while being turned, and consequently through the medium of the screw shaft the block 59 can be moved to nicely regulate the tension of the spring plate 56 and control capacity to any degree desired. The free portion of the spring plate 56—*i. e.*, the portion thereof at the opposite side of the adjustable block, with reference to the fixed block, governs the downward movement of the rear portion of the false bottom, and hence the said rear portion of the bottom will not be moved downward under the weight of the chicks gathered on the false bottom until the free portion of the spring plate 56 yields sufficiently for the purpose. When, however, the predetermined weight of chicks is on the false bottom and the rear portion of the false bottom is depressed against the action of the spring plate 56, the false bottom will depress the curvilinear spring plate and retract the spring trigger and thereby bring about the prompt gravitation of the door and in that way effectually prevent any more chicks entering the combined coop and brooder.

The walls 1 and 24 may be and preferably are held together by pressure of the two hover cleats 66 against the rear surface of the wall 24, the forward ends of said cleats 66 being fitted into shallow recesses 66ᵇ in the rear surface of the wall 24 and supported by the lower walls of said recesses. The rear ends of the cleats 66 are pivotally connected to the side walls of the body, and hence the forward ends of the cleats can be swung upwardly from the recesses in wall 24 and downwardly into said recesses. From this it follows that the cleats 66 serve the three-fold purpose of supporting the hover, binding the walls 24 and 1 together, and when swung upward on their pivots, which are preferably screws, permit the false bottom to occupy its working position, unattached and instantly removable and adapted to be as readily replaced. The said capacity of function of the cleats 66, and the adaptability of the floor or false bottom 41 to be removed with the wall 24, permits free access to the entire mechanism of the coop.

Supported by and movable horizontally on the cleats 66 is the hover which I prefer to employ in the combined brooder and coop. The said hover is constructed in such manner as to permit the free descent of pure air and ascent of warm and vitiated air, and this without subjecting the chicks to drafts. It comprises two frame sections each of which has a plurality of slats 67 separated by intervening spaces to enable pure air to pass downward and vitiated air to pass upward, a hinge connection 68 between said frame sections, and strips 69 of cloth or other suitable material depending from the frame sections. The adaptability of the hover to be folded permits of the space in the body being increased to facilitate feeding, as on a rainy day. The sliding forward of the hover permits of the chicks being conveniently inspected; also, when necessary, the hover as a whole may be quickly and easily lifted out of the coop. It is also well to mention in this connection that the depending strips of cloth are omitted from the hover slats in a narrow circular path around the two sides and rear edge of the hover frame, this in order to render the space between the hover and the body walls less comfortable than the hover proper, and in that way prevent the gathering of chicks in piles in said corners and the attendant liability of suffocation and loss of chicks.

At 70 is a cloth litter sack, preferably of the general shape shown—i. e., it comprises a bottom wall, two side walls and a back wall. From the top of the rear wall the two side walls taper in a straight line to the base of the inside edge of wall 24, and the sack is held very snugly against the wall 24 at its extreme bottom and immediately over the free space left around the vertically movable or false bottom. The edges of the movable bottom 41 must necessarily be unattached to anything fixed or stationary except where hinged to the wall 24. Therefore a free space is left all around the movable bottom between it and the inside of the body 1, and the main object of the litter sack 70 is to securely protect said free space from litter and debris of every kind. Otherwise the most important operation or capacity of function of the invention would be prevented by the debris.

It will be observed that the litter sack is a box made of one continuous piece of strong cloth with the upper edges of its side walls beginning at the base of the wall 24 and gradually rising to a point on the rear wall 1 just under the hover cleats 66. The litter sack is secured in this position by means of a strong wire frame $70^c$, shaped to fit snugly the inside square of the body 1; the said frame being detachably secured in the upper edge of the litter sack by means of a casing stitched around the frame portions at the top of the sack. A small slot $70^e$ is cut in the back top center of the casing for the insertion of the wire frame, the frame being cut at said point for insertion. The loose end portions of the wire frame are securely held under the edges of a small grooved piece of sheet-metal $70^d$, tacked to the inside of the back wall of the body at the height of the back wall of the litter sack when the bottom of the sack is resting on the top of the movable or false bottom as fully depressed. See Fig. 10.

It will be gathered from the foregoing that the litter sack contributes materially to the warmth of the brooder by making the second or auxiliary dead-air space under the chicks, and serves as a warm lining for the chicks to nestle against; also, the peculiar shape of the litter sack renders the front wall 24 much more undesirable for the chicks to hover against than if the brooder were cloth lined, and therefore the peculiar sack tends to make the chicks seek the rear lined portion of the brooder, which position of the chicks is in keeping with the principle of the device. Moreover the peculiar sack contributes to the cheapness of the device, and adapts the device as a whole to be easily cleaned. It also follows that the sack can be expeditiously and easily removed when occasion demands, for cleaning and spraying.

The entire bottom of the litter sack is covered with a thin piece of strong fiber board $70^f$ which lies loosely on the bottom of the sack and under the litter, this with a view to rendering the sack dry and warm, and protecting the litter sack from being soiled and from being scratched out of position by chicks when searching for feed.

In the foregoing connection I would have it distinctly understood that the litter sack may be secured above the false bottom or floor 41 in any approved manner without involving departure from the scope of my claimed invention.

Having described my invention, what I claim and desire to secure by Letters Patent, is:

1. A device of the character described, comprising a body having a front wall and an entrance opening therein and also having a bottom wall and vertical sockets in the forward portion thereof; a wall arranged upright in the body and spaced from the front wall thereof and having an entrance opening and also having pins seated in said sockets; a vertically-movable bottom hinged to the lower portion of said upright wall and having a rearwardly extending pin on its rear end; a spring plate connected with and extending upward from the bottom of the body and having its free upper portion disposed under the movable bottom; a gravitating door pivoted and adapted to swing between the front wall of the body and the upright wall spaced from said front wall and having a finger; a suitably supported spring trigger constructed to permit the finger to pass it when the door is raised and to prevent gravitation of the door; a spring plate disposesd transversely of the body at the back thereof and supported and fixed at one end and having its opposite end free to move vertically, said spring plate being disposed under the rearwardly extending pin on the false bottom; a connection intermediate the spring trigger and the upwardly extending spring plate on the bottom of the body; a support movable under the free portion of the transversely disposed spring plate and in the direction of the length thereof, and having a screw-tapped aperture; and a shaft bearing in and extending through one side wall of the body and having a handle outside the body and also having a threaded portion disposed in said screw-tapped aperture of the movable support.

2. A device of the character described, comprising a body; a vertically movable bottom having a rearwardly extending pin; a spring plate disposed transversely of the body at the back thereof and fixed at one end and having its opposite end free to move vertically, said spring plate being disposed under said pin; a support movable under the free portion of said spring plate and in the direction of the length thereof and having a threaded aperture, and a transversely disposed threaded shaft mounted in and extending outside the body and extending through and engaging said threaded aperture.

3. A device of the character described, comprising a body having a front wall and an entrance opening therein; an upright wall arranged in the body and spaced from said front wall and having an entrance opening; a vertically-movable bottom hinged to the lower portion of said upright wall and adapted to swing vertically; a gravitating door pivoted and adapted to swing in the space between the front wall of the body and the upright wall in the body and having a finger; a suitable supported spring trigger constructed to permit the finger to pass it when the door is raised and to normally prevent gravitation of the door, and means connected with the said spring trigger for retracting the same rearwardly and releasing the finger of the door when the rear portion of the false bottom is depressed.

4. A device of the character described comprising a body having front and back walls and side walls the upper edges of which are disposed below the upper edges of the front and back walls and also having recesses in the upper edges of said side walls; flanges fixed on and extending forwardly and rearwardly from the upper edges of the front and back walls, respectively; a sheet-metal top having flanges engaged with and slidable lengthwise on the flanges on the front and back walls of the body; a wood portion arranged at the under side of and fixed to the sheet-metal top and movable through the recesses in the upper edges of the side walls of the body; and curtains connected to and depending from the ends of said top.

5. In a device of the character described, the combination of a body having a front wall provided with an entrance opening; an upright wall arranged in the body and spaced from said front wall and having an entrance opening in alinement with said entrance opening in the front wall; a gravitating door mounted and movable vertically in the space between said walls; means constructed to permit of raising of the door and also constructed to normally maintain the same in raised position; and means for actuating said door-holding means and releasing the door.

6. A gravitating door for the purpose described comprising a U-shaped frame having an arm at one of its ends adapted to be mounted in pivotal manner and also having a finger on said arm; a bail-shaped sub-frame having its arms arranged between and fixed to the sides of the U-shaped frame and also having its cross-bar extending between said sides at an intermediate point in the height thereof; and a textile covering slipped over the U-shaped frame and sub-frame and having thicknesses at opposite sides thereof and also having said thicknesses connected by means arranged within the U-shaped frame and above the sub-frame, and other means arranged within the sub-frame.

7. A device of the character described, comprising a body having a front wall and an entrance opening therein; an upright wall arranged in the body and spaced from said front wall and having an opening alined with that of the front wall; a gravitating door for controlling said openings, said door being movable in said space; a vertically movable bottom hinged to and extending rearward from the upright wall, means yieldingly supporting the rear portion of the vertically-movable bottom; means yieldingly supporting the gravitating door and constructed on depression of the vertically-movable bottom to release said door; and a litter sack disposed in the body and above said vertically movable bottom.

8. In a device of the character described, the combination of a body having an upright wall in which is an opening, and also having a second upright wall spaced from the first-named upright wall and provided with an opening in alinement with the first-named opening, a movable bottom or floor in the body, a litter sack disposed in the body and above said bottom or floor, an entrance door between said upright walls, and means for bringing about the release and closure of said door when there is sufficient weight imposed on the movable bottom.

9. In a device of the character described, the combination of a body having an upright wall in which is an opening and also having a second upright wall spaced from the first-named upright wall and provided with an opening in alinement with the first-named opening, a vertically movable floor in the body, a litter sack cased on a supporting frame and mounted in the body and above said floor, a swinging door arranged between the said upright walls in position to control said openings, and means intermediate the floor and door for actuating the latter on depression of the floor.

10. In a device of the character described, the combination of a body, a litter sack therein, and a board in the sack above the bottom thereof.

11. In a device of the character described, the combination of a body, a movable floor therein, a supporting frame removably arranged in the body and above the movable floor, and a litter sack cased on the supporting frame and disposed above the movable floor and removable with the supporting frame.

12. In a device of the character described, the combination of a body having an upright wall, an upright wall spaced from the first-named upright wall, a yieldingly supported vertically-movable floor hinged to the second-named upright wall, and vertically swinging cleats pivoted at their rear ends to the body and having their forward ends detachably engaged with the second-named upright wall, whereby when the cleats are swung upward, the second-named upright wall and the movable floor can be lifted from the body.

13. In a device of the character described, the combination of a body having an upright wall, an upright wall spaced from the first-named upright wall, a yieldingly supported vertically-movable floor hinged to the second-named upright wall, and a foldable hover removably and slidably arranged on said cleats.

14. In a device of the character described, the combination of a body having an upright wall, an upright wall spaced from the first-named upright wall, a yieldingly supported vertically-movable floor hinged to the second-named upright wall, a litter sack removably arranged in the body and above the said floor, vertically-swinging cleats pivoted at their rear ends to the body and having their forward ends detachably engaged with the second-named upright wall, and a foldable hover removably and slidably arranged on said cleats, whereby when the cleats are swung upward, the second-named upright wall, the movable floor and the litter sack can be removed from the body.

15. In a device of the character described, the combination of a body, a vertically movable floor therein, and a litter sack disposed in the body and above the floor and having a bottom wall and a back wall, the latter attached to the back wall of the body and also having side walls tapered or gradually reduced in height from the back wall of the body to the front wall thereof.

In testimony whereof I have hereunto set my hand in presence of two subscribing witnesses.

ISAAC J. PLOUGHE.

Witnesses:
WILLIAM HULL GILLES,
STEPHEN BENSON.

---

Copies of this patent may be obtained for five cents each, by addressing the "Commissioner of Patents, Washington, D. C."